United States Patent Office 3,448,054
Patented June 3, 1969

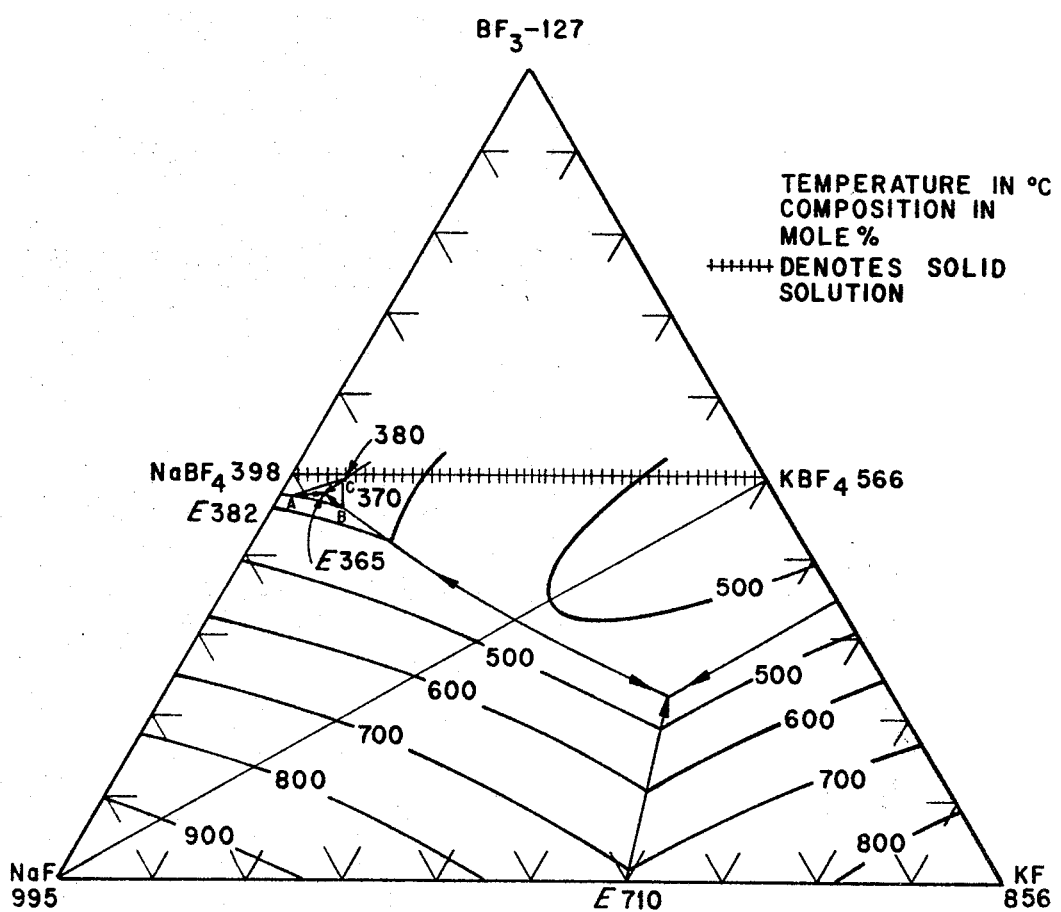

3,448,054
COOLANT SALT FOR A MOLTEN SALT BREEDER REACTOR
Roy E. Thoma, Jr., Oak Ridge, and Gordon M. Hebert, Knoxville, Tenn., assignors to the United States of America as represented by the United States Atomic Energy Commission
Filed Nov. 25, 1966, Ser. No. 597,145
Int. Cl. C09k 3/02
U.S. Cl. 252—71
2 Claims

ABSTRACT OF THE DISCLOSURE

This invention relates to a ternary molten fluoride salt composition of NaF—KF—$BF_3$ suitable as a secondary coolant salt and/or heat transfer fluid for a breeder-type molten salt reactor.

---

This invention described herein was made in the course of, or under, a contract with the U.S. Atomic Energy Commission. It relates generally to coolant fluids for nuclear reactors and more particularly to a ternary molten salt composition which is suitable as a secondary coolant salt and/or heat transfer fluid for a breeder-type molten salt reactor.

Nonaqueous fluid fuel reactors have been widely investigated. Of these, molten salt reactors, owing to the low liquidus temperature, low vapor pressure, good chemical and radiation stability and high heat transfer of the salt composition, are particularly attractive. As useful systems for power production, molten salt reactors are highly versatile and may be employed as a thermal and/or fast converter or breeder reactors. The technology, while in an early stage of development, has been demonstrated. In an early system (Aircraft Reactor Experiment) a 2.5 mw.(th) reactor was demonstrated using a NaF—$ZrF_4$—$UF_4$ fuel composition; and in a recent development at Oak mw.(th) reactor was demonstrated using a NaF—$Zr_4$—$UF_4$ fuel composition; and in a recent development at Oak Ridge National Laboratory a 10 mw.(th) molten salt reactor, which employed a fuel composed of $7_{LiF}$—$BeF_2$—$ZrF_4$ containing highly enriched $235_{UF_4}$ dissolved therein, was successfully placed into operation. Particular emphasis is presently being placed on expanding this technology to breeder reactors which may advantageously be coupled to a steam cycle of an electrical power plant such as a 1000 mw.(e) plant. For this, a secondary coolant which is compatible with the respective systems, i.e., nuclear and conventional, must be employed to effect this coupling.

It is therefore a primary object of this invention to provide a secondary coolant salt composition which is useful for coupling a molten salt breeder reactor to a conventional electrical generating facility.

Another object is to provide a salt composition which is used as a secondary coolant for a molten salt breeder reactor.

A further object is to provide a metal fluoride ternary salt composition which has a liquidus temperature of about 365° C.

A still further object is to provide a secondary coolant for a molten salt breeder reactor which is inexpensive, chemically stable and has acceptable nuclear and physical properties.

These and other objects of the present invention are accomplished by providing molten salt mixtures of NaF—KF—$BF_3$ having a composition essentially within the area ABC of the accompanying ternary phase diagram. Applicant has found that the ternary salt mixture of NaF—KF—$BF_3$ having a composition within about ±5 mole percent of the eutectic composition uniquely satisfies all criteria for a Molten Salt Breeder Reactor such as a 1000 mw.(e) MSBR as a scondary coolant and coupling medium to a steam cycle of a steam plant. The liquidus temperature for the eutectic composition of 48 NaF—4KF—$48BF_3$ mole percent is about 365° C., which is a preferred composition. Estimated thermophysical properties of the salt composition are: vapor pressure—6.8 mm. at 307° C. and 229 mm. at 607° C.; liquid density—2.1 g./cm.³; specific heat—0.4 cal./g.—° C.; viscosity—7 centipoise at 446° C. and 14 at 436° C.

The invention will hereinafter be described with reference to a 1000 mw.(e) Molten Salt Breeder Reactor (MSBR) which is coupled to a 1000 mw.(e) steam generator plant operating with a steam circuit temperature parameter of 370°–600° C. It will be appreciated that the temperature range over which the coolant salt must operate is fixed by the temperature extremes of the steam circuit; and while the invention is described with particular reference to a 1000 mw.(e) steam generator plant, such as the TVA Bull Run Plant modified to a 1000 mw.(e) rating, it is to be understood that the disclosed coolant salt composition may be employed in any breeder reactor as a secondary coolant salt or as a working fluid to couple a breeder reactor with a steam generator facility in which the steam circuit operates within this range of temperatures. For a more detailed description of the reference design for the 1000 mw.(e) Molten Salt Breeder Reactor and coupled steam generator plant see ORNL-3996, "Design Study of 1000 mw.(e) Molten Salt Breeder Reactors," by P. R. Kasten et al.

Briefly, the MSBR reference design concept is a two-region, two-fluid system, with fuel salt separated from the blanket salt by graphite tubes. The fuel salt consists of uranium fluoride dissolved in a mixture of the fluorides of 7-lithium and beryllium, and the blanket salt is a eutectic mixture of the fluorides of 7-lithium and thorium. The fuel composition enters the core at about 538° C. and leaves at 704° C., while the blanket salt enters at 621° C. and leaves at 677° C.

The energy generated in the reactor fluid is transferred to the secondary coolant-salt circuit which couples the reactor to a supercritical steam cycle. For this the coolant enters the shell side of the primary heat exchanger at 455° C. and leaves at 600° C. After leaving the primary heat exchanger, the coolant salt, which in a preferred embodiment comprises a 48 NaF—4KF—$48BF_3$ mole percent mixture, is further heated to 607° C. on the shell side of the blanket heat exchangers and then circulated through the shell side of 16 once-through superheaters. The supercritical fluid enters the tube side of the superheater at 371° C. and 3800 p.s.i. and leaves at 538° C. and 3600 p.s.i. By employing a supercritical fluid system an overall plant thermal efficiency of about 45% is obtained. Additionally, a portion of the coolant salt is circulated through a bank of reheaters which transfer energy from the coolant salt to the working fluid before its use in the intermediate pressure turbine.

The coolant salt compositions of this invention may be prepared from commercially available reagents. On a laboratory scale the preferred salt composition of 48

NaF—4KF—$48BF_3$ (mole percent) can be prepared by melting together a mixture of crystalline sodium fluoroborate ($NaBF_4$), potassium fluoroborate (KBF$_4$) and potassium fluoride (KF). As a special point ammonium bifluoride (NH$_4$F·HF)

which serves as a purifying agent to remove any moisture and/or oxide present and which together with these fluorides forms quite low melting mixtures, is added to the initial charge. The resulting mixture is heated first to about 150° C. to form a slurry and to cause any oxide impurities to be converted to fluorides by reaction with the ammonium bfluoride, and finally to about 500° C. to remove excess NH$_4$F and to effect complete fission of the components. This procedure provides an anhydrous and pure fused salt mixture when heated to operating temperatures.

Applicants have found that BF$_3$, which is a gas at room temperature and melts at −127° C., in combination with sodium fluoride and potassium fluoride forms the thermodynamically stable intermediate compounds, sodium fluoroborate (NaBF$_4$) which has a melting temperature of 395° C., and potassium fluoroborate (KBF$_4$) which has a melting temperature of 566° C., respectively. Referring to the ternary phase diagram, it will be apparent that inasmuch as compositions which are of higher BF$_3$ concentrations than the NaBF$_4$—KBF$_4$ solid solution will exhibit much lower liquidus temperatures and much higher vapor pressures than the preferred composition, their use could be accomplished only under large BF$_3$ gas overpressures, such as for example 100 atmospheres. In contrast salt compositions within the triangular area ABC can operate at atmospheric pressure though a closed system may be required due to the finite vapor pressure of the salt composition ( 229 mm. Hg) at an operation temperature of 607° C.

Advantageously, whereas helium is usually employed as a blanket gas in coolant circuits, BF$_3$ gas may be employed as the blanket thereby insuring that the composition of the coolant salt remains at optimal composition for this application.

What is claimed is:
1. A molten fluoride salt mixture comprising

NaF—KF—BF$_3$ having a composition essentially within the area ABC of the accompanying figure.

2. The salt mixture of claim 1 wherein said composition is 48 NaF—4KF—48BF$_3$ mole percent, said composition having a liquidus temperature of 365° C.

References Cited

Levin et al.: Phase Diagrams for Ceramists, The American Ceramic Society, 1964, p. 432.

LEON D. ROSDOL, *Primary Examiner.*

I. GLUCK, *Assistant Examiner.*

U.S. Cl. X.R.

176—92